United States Patent [19]
Mojden et al.

[11] Patent Number: 5,450,679
[45] Date of Patent: Sep. 19, 1995

[54] ROTARY OVEN CONVEYOR

[75] Inventors: Andrew E. Mojden, Hinsdale; Miroslav W. Vejchoda, Downers Grove, both of Ill.

[73] Assignee: Fleetwood Systems, Inc., Romeoville, Ill.

[21] Appl. No.: 58,640

[22] Filed: May 6, 1993

[51] Int. Cl.⁶ .......................................... F26B 25/00
[52] U.S. Cl. .................................. 34/105; 34/438; 34/207; 198/345.1; 198/690.1; 198/679
[58] Field of Search ................. 34/437, 438, 440, 104, 34/105, 107, 184, 189, 190, 207; 198/345.1, 441, 439, 679, 690.1

[56] References Cited

U.S. PATENT DOCUMENTS

| | | | |
|---|---|---|---|
| 2,731,137 | 1/1956 | Socke | 198/179 |
| 2,743,001 | 4/1956 | Nordquist | 198/66 |
| 2,862,601 | 12/1958 | Littwin et al. | 198/25 |
| 3,164,269 | 1/1965 | Roosevelt | 214/6 |
| 3,165,210 | 1/1965 | Mojden et al. | 214/7 |
| 3,499,199 | 3/1970 | Mojden et al. | 29/121 |
| 3,840,999 | 10/1974 | Whelan | 34/105 |
| 4,052,152 | 10/1977 | Whelan et al. | 34/105 |
| 4,098,568 | 7/1978 | Neumann | 432/230 |
| 4,830,169 | 5/1989 | Nariki et al. | 198/345 |
| 4,974,716 | 12/1990 | Yuri et al. | 198/345 |

*Primary Examiner*—Denise L. Gromada
*Attorney, Agent, or Firm*—Trexler, Bushnell, Giangiorgi & Blackstone, Ltd.

[57] ABSTRACT

A rotary oven conveyor apparatus is provided for receiving a continuous flow of articles such as can ends and for conveying the articles in an on-edge, spaced apart condition for a selectable predetermined period of time, to facilitate a treatment such as oven curing of a coating previously applied to the articles. The rotary oven conveyor comprises an enlarged wheel structure defining an axis and having a diameter many times the cross-sectional dimensions of the articles and mounted for rotation about its axis. A drive rotates the wheel structure about its axis. An article-receiving area is defined about an outer periphery of the wheel structure and is configured for partially surroundingly recieving the articles. A magnetic structure is mounted adjacent the article-receiving area for magnetically attracting articles to the article-recieving area and for maintaining articles in the article-receiving area in an on-edge, spaced apart condition, projecting generally radially outwardly of the periphery of the wheel structure.

18 Claims, 4 Drawing Sheets

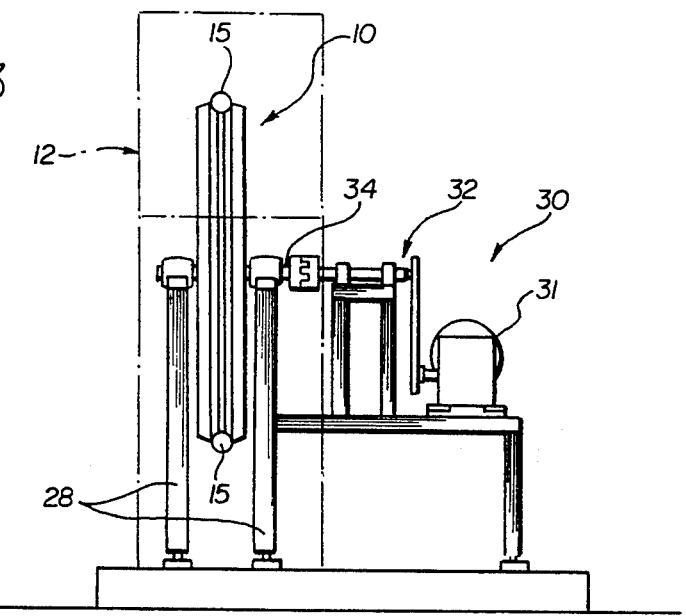
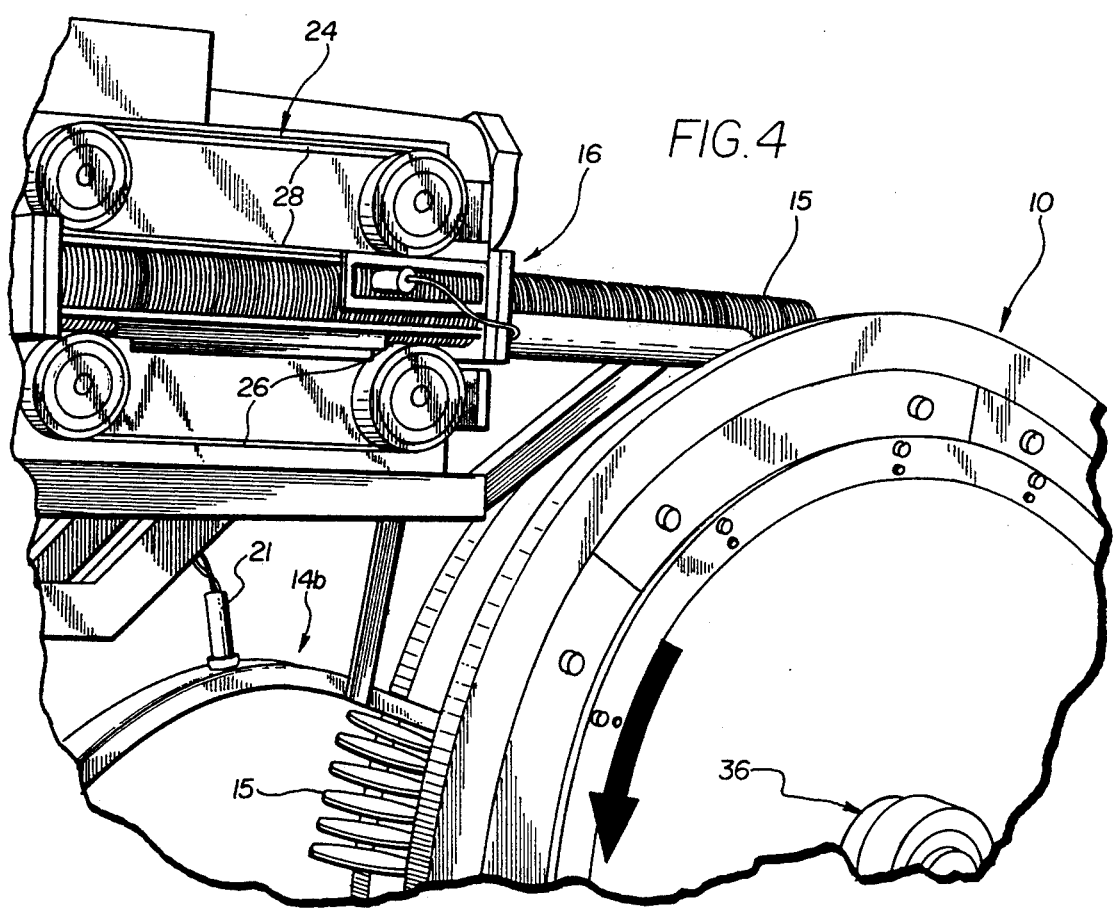

ROTARY OVEN CONVEYOR

BACKGROUND OF THE INVENTION

The present invention is directed generally to the article handling arts and more particularly to a novel and improved rotary type conveyor. While the rotary conveyor of the invention may find other applications, the following description will refer particularly to the use of the invention in conveying a plurality of articles such as can ends through a treatment process such as an oven in which a coating previously applied to the can ends is cured by exposure to air at a predetermined elevated temperature for a predetermined period of time.

In modern can end fabrication operations, a large number of can ends are processed and fabricated at a relatively high rate. To enjoy the economies of scale possible in such a relatively high speed operation, it is important that the can ends be handled accurately and expeditiously. In this regard, the can ends are often conveyed from one portion or station in the fabricating operation to the next in a generally facewise nested condition, in a generally continuous stream or flow. In some instances where it is required that the can ends be handled in a flat condition, that is, such that their surfaces are exposed to be operated upon or treated in some fashion, various conveyor apparatus maybe utilized to convert or turn the can ends individually from their facewise nested condition to a flat, end-to-end condition, in which condition the ends may be fed along a further conveyor belt or the like to or past such further processing stations or apparatus.

In particular, following the initial stamping or formation of the can ends from suitable aluminum or other metallic material or blanks, frequently a tear-away opening portion is formed in the can end. This is frequently accomplished by scoring of the material in the desired shape of the opening and the application of a graspable portion such as a pull ring or tab, or the like. This latter graspable portion is often applied with a rivet which extends through both the graspable portion and the can end.

Following this scoring and tab or ring application, it is often desirable to apply a coating of suitable material to effect "repair" of the product side of the can end, for example to assure that the can end will maintain a seal, and to overcome the effect of any slight perforations or imperfection which may occur as a result of the scoring and application of the pull ring or tab. Various coatings may also be applied in accordance with requirements of a final end user, such as may be appropriate for lining the interior of the can for various applications such as foods and beverages, or other contents which may require a specialized coating in some form.

Such coatings may be applied in a powdered or liquid spray form, and often require a period of heat curing prior to further processing of the can end. Heretofore, it has been the practice to deliver such can ends, following the coating or spraying operation, to a relatively large, cookie-type of oven. Generally speaking the can ends are conveyed through a relatively long "cookie" oven in a flat, end-to-end condition. The speed of the conveyor through the oven, the overall length of the oven and the temperature inside of the oven are all selected to assure proper curing of the coating while the can ends are traversing the oven, and for maintaining the desired rate of can end processing on a number of ends per unit time basis.

However, use of ovens of this type has given rise to a number of problems and shortcomings. For example, these relatively large ovens consume a large amount of heat energy, thus adding considerably to the energy costs of the can end processing operation. Moreover, such ovens are relatively large and relatively long (e.g. on the order of twenty feet or more) and thus take up a relatively large amount of floor space in the processing plant. Floor space is generally at a premium in such operations, and the provision of additional floor space can add considerably to the capital costs and hence the overall costs of the processing operation. Moreover, it has heretofore proven difficult to devise a suitable conveyor system which is capable of reliably conveying the can ends with their product sides exposed for curing, through such an oven at a reliable, controllable speed, over long periods of time. Many rubber or rubber-like belt or conveyor materials fail to withstand the temperatures of the curing oven over long periods of continuous operation. In this regard, it has heretofore been believed necessary to convey the can ends through the oven in a flat, end-to-end condition to assure adequate exposure of the coated surfaces for curing.

Moreover, devising conveyor belts for conveying cans in an upright or on-edge, but spaced apart condition has generally proven difficult. For example, it is generally necessary to provide support at two points about the periphery of the can end to convey it in a generally upright or on-edge position relative to the conveyor. However, given the relatively long length of the curing oven, it has proven difficult to maintain exact positional symmetry as between two supporting belts, which can cause eventual tilting and misalignment of can ends, leading to dislodgement thereof from the belts, and failure to restack properly in a facewise nested condition, upon leaving the oven. Where one or more can ends becomes dislodged during a handling operation carried out at a relatively high rate, many deleterious effects can ensue. For example, dislodged can ends may jam or otherwise jeopardize equipment. A few dislodged can ends may jam in such a manner as to cause many dozens of can ends to similarly become dislodged. Subsequent down time, clean up, repair, etc. is quite costly and detracts from the desired efficiency and economies of such a large scale, high speed operation.

OBJECTS AND SUMMARY OF THE INVENTION

Accordingly, it is an object of the present invention to provide a novel and improved rotary oven conveyor which overcomes the foregoing problems and shortcomings of the prior art.

A related object is to provide a rotary oven conveyor in accordance with the foregoing object which permits can ends to be reliably cured at a relatively high overall rate of operation while permitting use of a relatively small oven, requiring considerably less floor space and less energy consumption than ovens of the type heretofore utilized.

Briefly, and in accordance with the foregoing objects, the invention provides a rotary oven conveyor for receiving a continuous flow of articles such as can ends and for conveying said articles in an on-edge, spaced apart condition for a selectable predetermined period of time, to facilitate treatment of said articles such as oven curing of a coating previously applied to said articles. The rotary oven conveyor includes an enlarged wheel structure having a diameter many times the cross-sectional dimensions of said articles and mounting means for mounting the wheel structure for rotation. A drive device is provide for rotating the wheel structure. An article receiver is mounted to the wheel structure and defines an article-receiving area about an outer periphery of the wheel structure configured for partially surroundingly receiving the articles. Magnetic elements are mounted to the wheel structure adjacent said article-receiving area for magnetically attracting the articles to said article receiving area and for maintaining the articles in said article receiving area in an on-edge, spaced apart condition, projecting generally radially outwardly of the periphery of the wheel structure.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 3 is an end elevation taken generally in the plane of the line 3—3 of FIG. 1;

FIG. 4 is an enlarged perspective view illustrating a portion of the rotary conveyor of the invention, together with portions of infeed and outfeed conveyors;

DETAILED DESCRIPTION OF THE ILLUSTRATED EMBODIMENT

Figure 1:
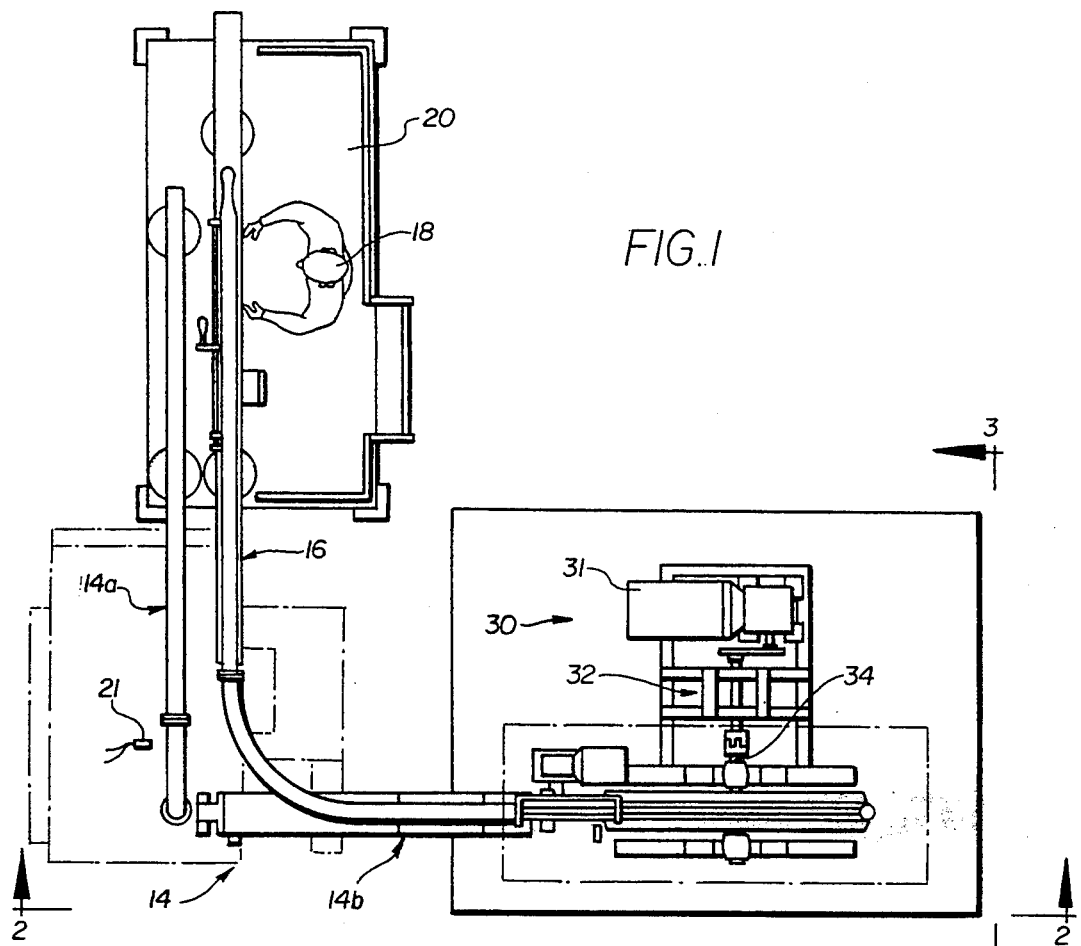
FIG. 1 is an overhead plan view of a curing oven utilizing a rotary oven conveyor in accordance with the invention, and also showing infeed and outfeed apparatus for use therewith.
Figure 2:
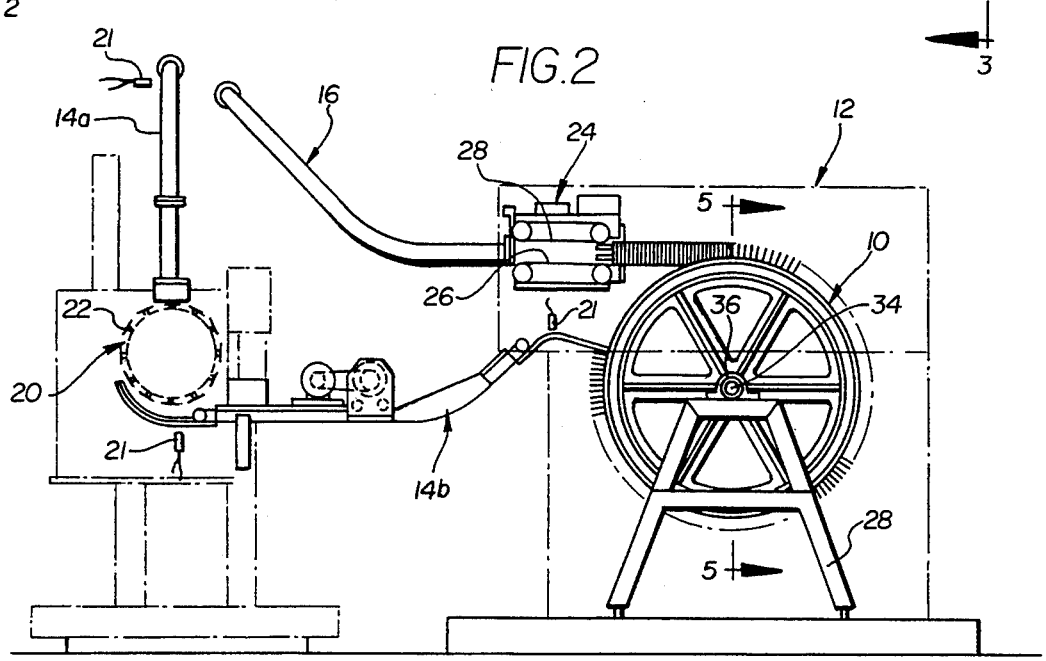
FIG. 2 is a partially broken away side elevation taken generally in the plane of the line 2—2 of FIG. 1.

Referring now to the drawings, and initially to FIGS. 1–3, a rotary oven conveyor in accordance with the invention is designated generally by the reference numeral 10. The rotary oven conveyor 10 is located inside of a controlled environment enclosure such as a curing oven 12. The conveyor is provided with an infeed conveyor 14 and an outfeed conveyor 16. The infeed conveyor 14 receives can ends 15 from a coating or spraying machine at which a suitable powder or liquid coating is applied thereto. The outfeed conveyor 16 receives can ends 15 which have been heat treated or cured in the oven 12 and delivers the ends to further apparatus (not shown) for further processing. An operator 18 may monitor the infeed conveyor 14 and outfeed conveyor 16 from an operator station or platform 20. Additionally, jam sensors 21 may be provided at appropriate points along the inlet and outlet conveyors 14, 16 to detect any back up or jamming of ends as they travel along these conveyors.

As best viewed in FIG. 2, the infeed conveyor 14 includes a first conveyor portion 14a in which the can ends 15 are conveyed in a facewise stacked condition. A rotary drum-type unit 20 picks individual ends from an outlet end of conveyor section 14a and feeds them to a second infeed conveyor section 14b in which the ends 15 are conveyed on a suitable belt or the like in a flat, end-to-end condition, to an input or infeed area of the rotary conveyor 10. Briefly, the drum unit 20 may include a plurality of selectably magnetizable heads 22 which are energized to pick ends 15 from the outlet of conveyor section 14a and deenergized to deposit ends at the inlet end of conveyor section 14b. Alternate means such as vacuum type heads may also be used for the heads 22 and energized and deenergized with a suitable vacuum or suction in generally the same fashion. Other means may be utilized to convert the flow of ends 15 from a facewise nested condition in conveyor section 14a to a flat, end-to-end condition on conveyor section 14b, without departing from the invention.

The outfeed conveyor 16 receives ends from an outlet or output end of the rotary conveyor 10 and restacks the ends 15 into a facewise nested condition, by means of a restacking and outfeed assembly or mechanism 24. Briefly, the mechanism 24 may comprise a pair of parallel rotating conveyors 26, 28 which engage the ends therebetween and propel the ends 15 generally in the direction indicated by the arrows.

A mounting means or frame 28 mounts the rotary conveyor 10 for rotation. Cooperatively, a drive means or assembly 30 including a motor 31 and drive linkage 32 is coupled to a shaft 34 which in turn is non-rotatably coupled or keyed to a hub portion 36 of the rotary conveyor 10, which will be seen to comprise an enlarged wheel or wheel-like structure.

It will be appreciated that the enlarged wheel structure 10 has a diameter many times the cross sectional dimensions or diameter of the can ends 15. The diameter of the rotary wheel structure 10 and the rotational speed of the motor 30 and drive 32 are arranged to assure that the ends remain in the oven 12 for a preselected period of time sufficient to obtain curing of the coating previously applied thereto, as the ends are carried by the rotary wheel structure 10 between an exit point of inlet conveyor 14b and entrance point of outlet conveyor 16. In this regard, the wheel rotates generally in the direction of the arrows in FIG. 2, which is counterclockwise as viewed in FIG. 2. Thus, the diameter of the rotary conveyor may be selected to maintain the desired can end processing rate.

Referring now also to remaining FIGS. 4-14 7, it will be seen that the rotary wheel structure 10 is configured for receiving and retaining can ends 15 in a generally radially outwardly extending or upright or "on edge" and spaced apart condition between the inlet conveyor 14b and outlet conveyor 16. Preferably, in this regard, the inlet conveyor 14b and outlet conveyor 16 meet the wheel 10 at points which are spaced apart by somewhat greater than 270° in the direction of rotation of the wheel 10. This is intended to maximize the time during which the can ends travel through the oven 12 held in a radially outwardly extending and spaced apart condition upon the wheel 10, while accommodating the largest possible number of can ends 15 upon wheel 10 at any given time. Stated another way, the inlet and outlet conveyors 14b, 16 are spaced as closely together as possible in order to require the least possible amount of "wheel space" to maximize the number of ends 15 which can be accommodated by the wheel 10 between the inlet conveyor 14b and outlet conveyor 16. This also maximizes the time of exposure to hot air circulation and consequently, curing of the coating which has been previously applied to the can ends 15, given the selected temperature of the oven 12 and selected speed of rotation of the wheel 10 by the motor 30. That is, these latter two factors, temperature and speed of rotation, can be selected to optimize curing, given the diameter of the wheel 10.

In the illustrated embodiment, the rotary conveyor 10 is preferably on the order of four (4) feet in outer diameter. Thus the oven 12 need be only about 6 feet in length, height and width including the drive assembly 30. Other diameters may be selected without departing from the invention. It will recognized that considerable savings can be realized in energy costs with an oven of these dimensions, as compared to a large (on the order of twenty feet long) cookie-type oven previously used for this purpose. Also, considerable factory floor space is saved by use of this oven, made possible by the novel configuration of the rotary conveyor of the invention. For example at a one inch spacing, a four foot diameter wheel 10 will accommodate approximately 110 ends, allowing for about 270° spacing between the inlet and outlet. If fed in a single file in flat, end-to-end condition, 2½ inch diameter ends would require an oven 23 feet long to accommodate this many, i.e., 110 ends.

Figure 5:
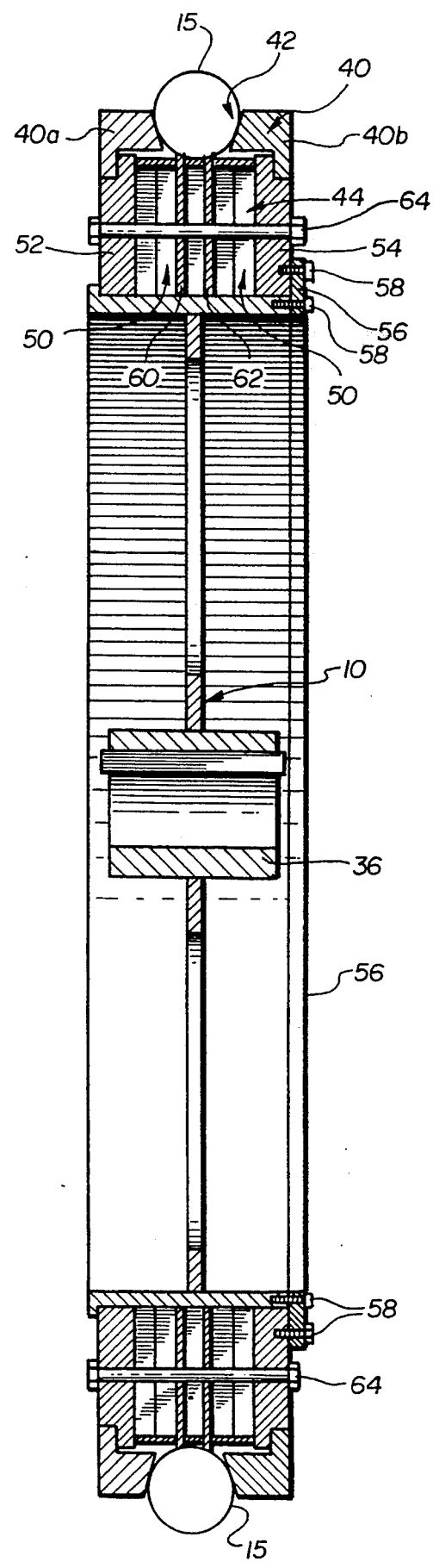
FIG. 5 is a sectional view of the rotary conveyor of the invention, taken generally in the plane of the line 5—5 of FIG. 2.
Figure 6:
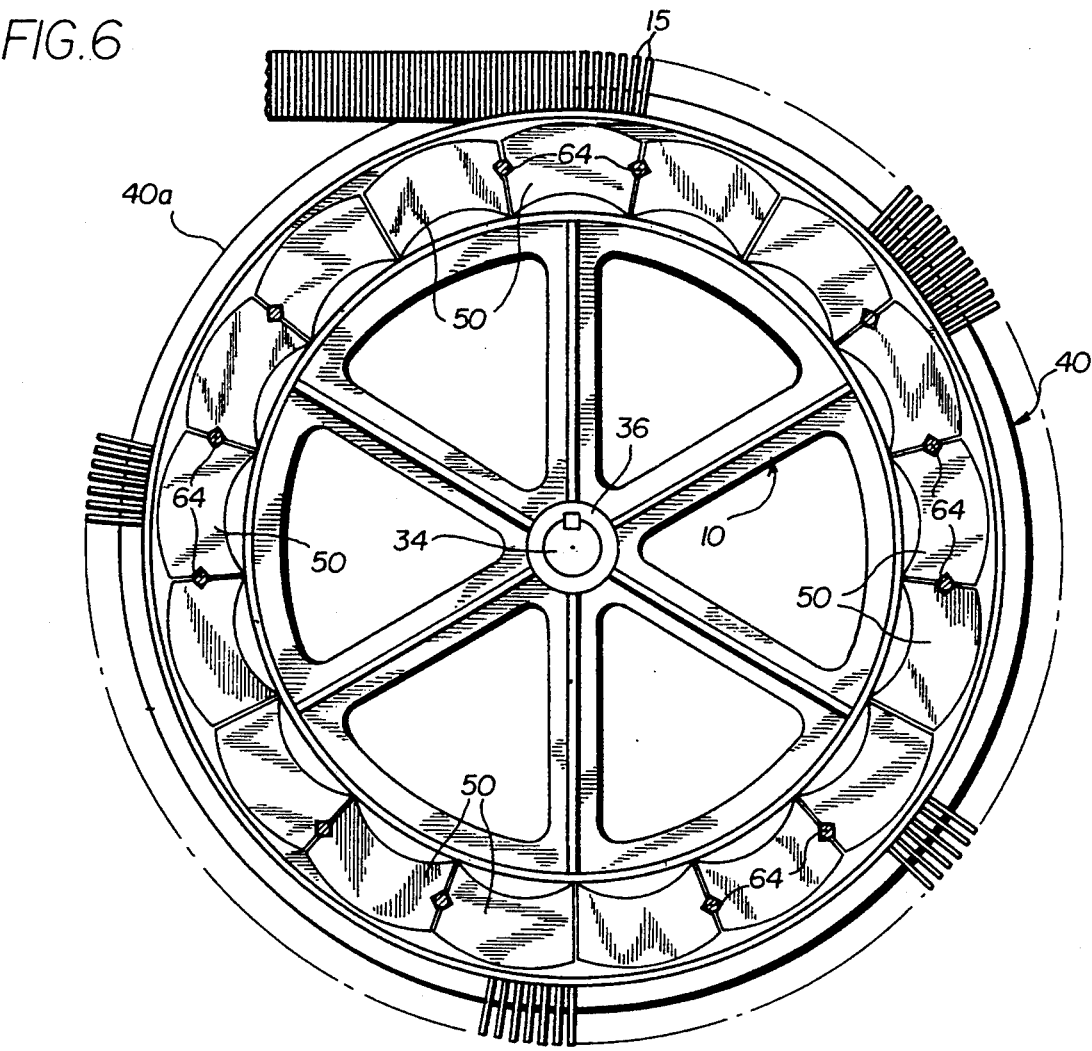
FIG. 6 is a side elevation of the structure of FIG. 5, with parts removed to show additional detail thereof.
Figure 7:
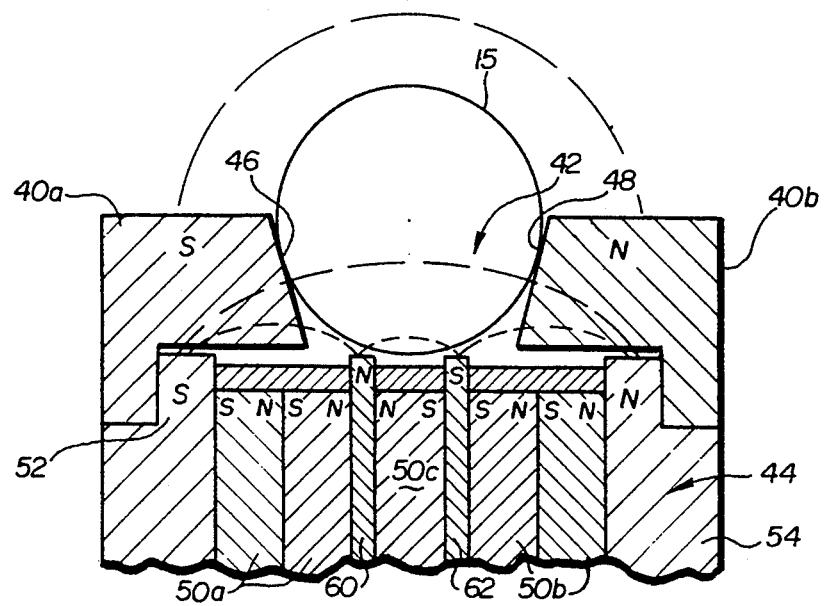
FIG. 7 is an enlarged partial view of a portion of FIG. 5, illustrating further details thereof.

Referring now to the remaining FIGS. 5–7 of the drawings, further details of the rotary oven conveyor of the invention are illustrated. As best viewed in FIG. 5, article receiving means 40 are mounted to the wheel structure 10 and define an article receiving area 42 about an outer periphery of the wheel structure 10 configured for partially surroundingly receiving the can ends. A magnetic means or assembly 44 is also mounted to the wheel structure 10, about its outer periphery, and adjacent the article receiving area 42 for magnetically attracting the can ends to the article receiving area 42 and for maintaining the can ends in an upright, or on-edge, spaced-apart condition, projecting generally radially outwardly of the periphery of the wheel 10. The article receiving means 40 will be seen to comprise a pair of annular retaining members 40a, 40b mounted about the outer periphery of the wheel structure 10 and having spaced apart inwardly facing surfaces 46, 48 which define therebetween the article receiving area 42.

The magnetic means or assembly 44 comprises a plurality of magnet elements 50 which are arranged about the periphery of the wheel structure 10 to form a substantially continuous annular magnetic structure therearound. A plurality of similar magnet elements or members 50 are mounted or arranged in axially directed rows (relative to the axis of rotation of the wheel 10) across the periphery of the wheel 10 in aligned, side-by-side groups, as best viewed in FIGS. 5 and 7. The magnet elements 50 thereby define axially extending groups of magnetic elements as best viewed in FIGS. 5 and 7, which groups extend in end-to-end condition about the periphery of the wheel structure, as best viewed in FIG. 6. As also best viewed in FIG. 6, in the illustrated embodiment, the magnet elements 50 are arcuately shaped.

The magnetic means or assembly 44 also includes a pair of generally annular outer or external pole pieces or magnet retaining members 52, 54 which are mounted about the wheel structure 10 and extend about its periphery to embrace the magnet elements 50 therebetween. Cooperatively, these pole pieces 52 and 54 are further shaped to interfit with the annular retaining members 40a and 40b, and are also configured to act structurally as retaining means for retaining the magnets 50 in place axially relative to the wheel structure 10. In this regard, an additional generally annular retainer ring 56 is also provided and is fastened by suitable bolts or other suitable fasteners 58 to the wheel structure 10 and to the pole piece or magnet retaining member 54. The members 40a and 52 are removed in FIG. 6 to facilitate viewing of magnets 50.

The magnetic means or assembly 44 further includes a pair of annular internal pole pieces 60, 62 in the illustrated embodiment. These pole pieces 60 and 62 are arranged intermediate respective ones of the magnet members 50. In the illustrated embodiment, the magnet members in each axial row are five in number with two pairs of magnet members 50a and 50b located to either side of a center magnet member 50c. The magnet members 50a and 50b are all arranged in the same relative north-south magnetic polarity or orientation, whereas the center magnet member 50c is arranged in reverse north-south magnetic orientation or polarity to the magnet members 50a and 50b.

The retaining members 40a and 40b are also preferably formed of a ferromagnetic material and therefore assume the same magnetic polarities as respective pole pieces 52 and 54, with which they are respectively closely engaged, as best viewed in FIGS. 5 and 7. Accordingly, the respective magnetic polarities and magnetic lines of flux are generally as indicated in FIG. 7, for encouraging the can ends 15 to remain in a generally upright or on-edge position, spaced apart about the periphery of the wheel structure 10. This upright or on-edge orientation and spacing between can ends facilitate curing as can ends are conveyed by the wheel 10 between the infeed conveyor 14b and the outfeed conveyor 16 within the oven 12.

Additional elongate, axially extending tie-rod or bolt means or elements 64 are also utilized at spaced locations about the periphery of the wheel 10 to hold the magnetic means or assembly together in assembled condition. These tie-rods 64 generally extend through complementary aligned through openings defined between the magnet members 50 and in the external and internal pole pieces 52, 54 and 60, 62, respectively for holding these elements together in assembled condition.

What has been illustrated and described hereinabove is a rotary oven conveyor apparatus which receives articles such as can ends from a first or infeed conveyor which carries the can ends or other articles in a generally flat, end-to-end orientation. The oven conveyor is mounted to rotate within a curing oven, and to maintain the articles in an upright or on-edge and spaced apart condition to facilitate exposure thereof to heated air within the oven for curing. The oven conveyor feeds the articles to an outfeed device which restacks the articles into a facewise nested condition. Preferably the outfeed conveyor is located at least 270° from the infeed conveyor in the direction of rotation of the rotary oven conveyor. The rotational speed of the rotary oven conveyor may be selected to maintain the articles within the curing oven for a sufficient period of time to assure the desired curing.

While particular embodiments of the invention have been shown and described in detail, it will be obvious to those skilled in the art that changes and modifications of the present invention, in its various aspects, may be made without departing from the invention in its broader aspects,. some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A rotary conveyor apparatus in combination with and housed substantially within a controlled environment enclosure, said rotary conveyor receiving a continuous flow of flat disc shape articles, such as can ends and conveying said articles in an on-edge, radially oriented condition in said controlled environment enclosure to facilitate treatment of said articles in the controlled environment for curing of a coating previously applied to said articles, said rotary conveyor comprising: an enlarged wheel structure defining an axis and having a diameter which is substantially greater than the cross-sectional dimensions of one of said articles; mounting means for mounting said wheel structure for rotation about its axis; drive means for rotating said wheel structure about its axis; circumferentially oriented article-receiving means on said wheel structure defining an article-receiving area about an outer periphery of said wheel structure configured for partially surroundingly receiving said articles; and magnetic means mounted to said wheel structure adjacent said article-receiving area for magnetically attracting said articles to said article receiving area and for maintaining said articles in said article receiving area in an on-edge condition, with said articles projecting generally radially outwardly from said article receiving means, said article-receiving means and said magnetic means being located and configured for contacting said articles at peripheral edges of said articles, with surfaces of said articles being radially spaced and exposed for treatment; and said magnetic means having a sufficient force of attraction for conveying said articles in an on-edge condition about said wheel structure in excess of 180° of rotation.

2. Apparatus according to claim 1 and further including infeed conveyor means for delivering a flow of said articles to said wheel structure in an end-to-end condition.

3. Apparatus according to claim 1 and further including outfeed conveyor means for collecting said articles from said wheel structure and for stacking said articles in a facewise nested condition.

4. Apparatus according to claim 2 and further including outfeed conveyor means for collecting said articles from said wheel structure and for stacking said articles in a facewise nested condition.

5. Apparatus according to claim 4 wherein said infeed conveyor means and said outfeed conveyor means are located circumferentially spaced by substantially 270° relative to said wheel structure, in the direction of rotation of said wheel structure.

6. Apparatus according to claim 1 wherein said article-receiving means comprises a pair of annular retaining members mounted coaxially about an outer periphery of said wheel structure and having spaced apart inwardly facing surfaces defining said article-receiving area therebetween.

7. Apparatus according to claim 1 wherein said magnetic means comprise a plurality of magnet elements arranged coaxially about the periphery of said wheel structure to form a substantially continuous annular magnet structure therearound.

8. Apparatus according to claim 7 wherein said plurality of magnet elements include a plurality of similar magnet elements arranged in axially directed rows, relative to said axis of said wheel structure, across the periphery of said wheel structure in aligned, side-by-side groups, thereby defining a plurality of axially extending rows of magnet elements extending about the periphery of said wheel structure.

9. Apparatus according to claim 8 wherein said magnet elements are arcuately shaped.

10. Apparatus according to claim 7 wherein said magnetic means include a pair of annular external pole pieces mounted about said wheel structure and extending about the periphery thereof for embracing said magnet elements therebetween.

11. Apparatus according to claim 8 wherein said magnetic means include a pair of annular external pole pieces mounted about said wheel structure and extending about the periphery thereof for embracing said magnet elements therebetween.

12. Apparatus according to claim 11 and further including a pair of annular internal pole pieces extending about the periphery of said wheel structure and located intermediate said external pole pieces and between selected ones of the magnet elements in each of said rows.

13. Apparatus according to claim 12 and further including elongate, axially extending tie-rod means extending through complementary aligned through openings defined by said magnet elements and by said external and internal pole pieces for holding the magnetic means together in assembled condition.

14. Apparatus according to claim 8 wherein at least three said magnet elements are provided in each axially extending row, the outermost ones of said magnet elements being oriented in like north-south magnetic polarity and the center one of said magnet elements being oriented in reversed north-south magnetic polarity with respect to the outermost ones of said magnet elements.

15. Apparatus according to claim 12 wherein at least three said magnet elements are provided in each axially extending row, the outermost ones of said magnet elements being oriented in like north-south magnetic polarity and the center one of said magnetic elements being oriented in reversed north-south magnetic polarity with respect to the outermost ones of said magnet elements and said internal pole pieces being located respectively to either side of a center one of said magnetic elements.

16. Apparatus according to claim 14 wherein five said magnet elements are provided in each axially extending row, four of said magnet elements being oriented in the same north-south magnetic polarity, and a center one of said magnet elements being oriented in reverse north-south magnetic polarity relative to the other four magnet elements.

17. Apparatus according to claim 15 wherein five said magnet elements are provided in each axially extending row, four of said magnet elements being oriented in the same north-south magnetic polarity, and a center one of said magnet elements being oriented in reverse north-south magnetic polarity relative to the other four magnet elements.

18. Apparatus according to claim 10 wherein said article-receiving means comprises a pair of annular retaining members mounted about the outer periphery of said wheel structure and having spaced apart inwardly facing surfaces defining said article-receiving area therebetween, and wherein said retaining members are configured for engaging said external pole pieces therebetween and are formed of a ferromagnetic material, such that said retaining members define further magnetic pole pieces partially surrounding said articles.

* * * * *